Oct. 18, 1938.　　　A. G. SHERMAN ET AL　　　2,133,835
STOVE
Filed April 18, 1935　　　2 Sheets-Sheet 1
Fig. 1.
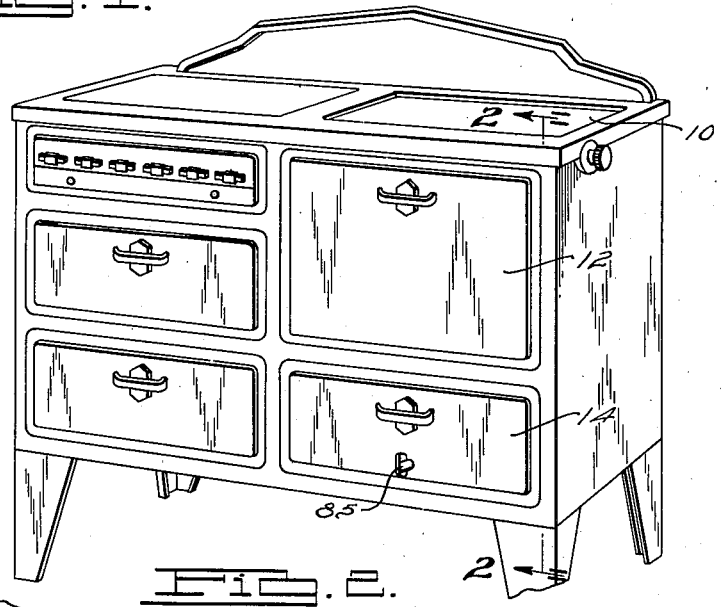
Fig. 2.
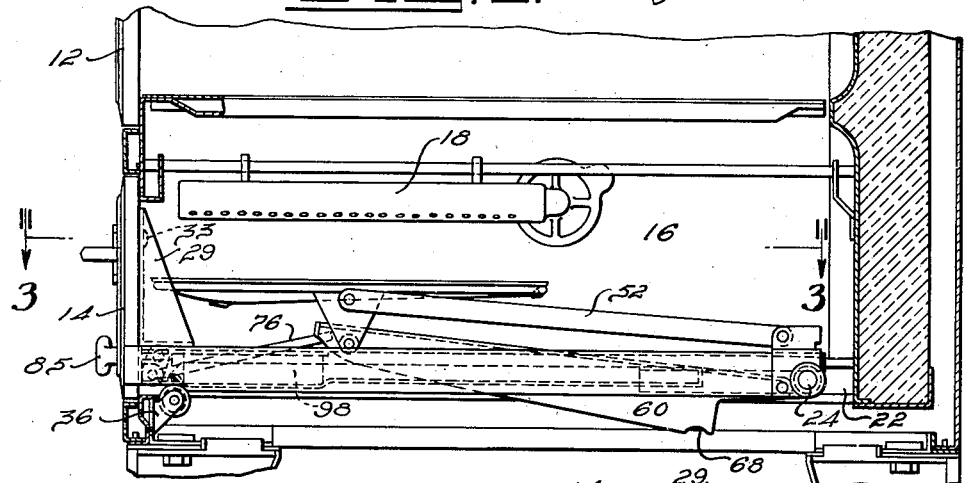
Fig. 7.
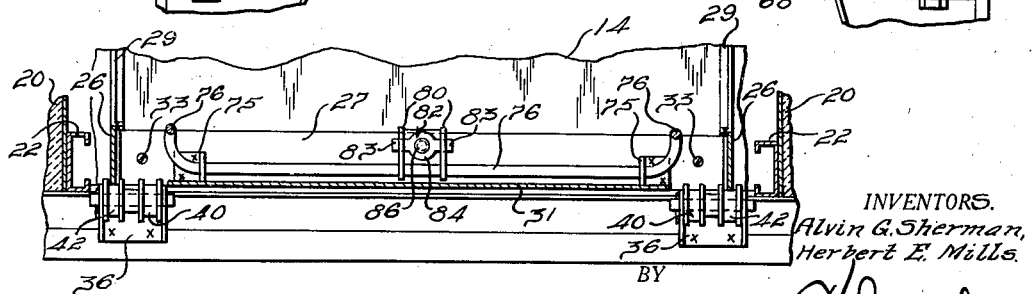
INVENTORS.
Alvin G. Sherman,
Herbert E. Mills.
BY 
ATTORNEY

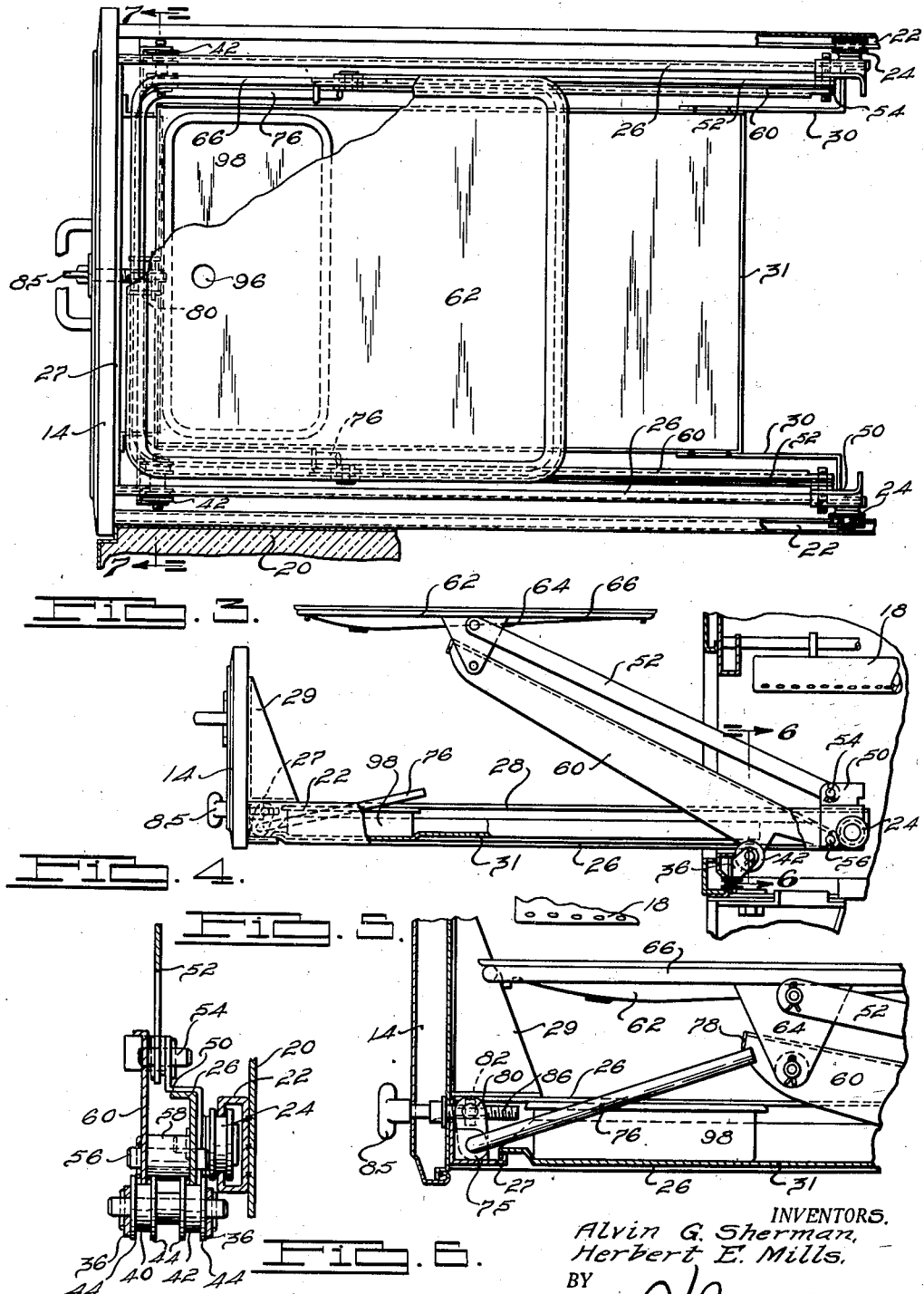

Patented Oct. 18, 1938

2,133,835

UNITED STATES PATENT OFFICE 2,133,835

STOVE

Alvin G. Sherman and Herbert E. Mills, Detroit, Mich., assignors to Borg-Warner Corporation, a corporation of Illinois Application April 18, 1935, Serial No. 16,952

13 Claims. (Cl. 126—41)

This invention relates to stoves and particularly to shelf construction for oven compartments of stoves.

In the embodiment of the invention selected for purposes of illustration, a broiler compartment of a stove such as a domestic gas range is provided with a source of heat such as a gas burner adjacent the top of the compartment, a means for supporting food below said source of heat within said compartment, a carriage movable into and out of said compartment and upon which said food supporting means is mounted, manually adjustable means for vertically adjusting the elevation of the food supporting means within the broiler compartment, and a means for elevating the food supporting means incidental to moving the carriage out of the broiler compartment.

In domestic ranges of the cabinet type, it is customary to provide a plurality of oven compartments, one superposed above the other, with a burner provided in the upper portion of the lower compartment and which burner is operable for heating the upper compartment and is used for broiling foods within the lower compartment. As the cabinet range is designed to provide what is commonly referred to as a table top at about the same elevation from the floor as the top of an ordinary table, it is apparent that the broiler compartment must be disposed quite closely to the floor upon which the cabinet range is supported. To eliminate the inconveniences resulting from using such a broiler compartment, we have provided a means for supporting food within the broiler compartment and below the burners thereof which is movable out of the burner compartment and upwardly incidental to the outward movement thereof, so that the broiler compartment may be conveniently used without any great inconvenience.

A principal object of the invention, therefore, is to provide a shelf structure for ovens which will operate to move the food supported upon such shelf out of the heated compartment and to a position where the food stuffs upon the same may be readily and conveniently inspected.

Another object of the invention is to provide a means whereby such a shelf may be adjusted within the oven compartment for the purpose of controlling the cooking of food stuffs supported upon such a shelf, as well as to accommodate food stuffs of various thicknesses.

Other objects and advantages of the invention will be apparent from the following specification taken in conjunction with the accompanying drawings, of which there are two sheets and in which:

Fig. 1 is a perspective view of a cabinet range embodying the invention;

Fig. 2 is a sectional view through the broiler compartment taken in a plane along the lines 2—2 of Fig. 1;

Fig. 3 is a plan view of the shelf and supporting mechanism within the broiler compartment and taken in a plane along the line 3—3 of Fig. 2, looking in the direction of the arrows;

Fig. 4 is an elevational view, partially in section, of the carriage and shelf supporting and elevating mechanism in a position out of the broiler compartment;

Fig. 5 is an elevational view of the mechanism operable for vertically adjusting the position of the shelf within the broiler compartment;

Fig. 6 is a detailed sectional view taken in the plane along the line 6—6 of Fig. 4 and illustrating the rollers on the stove frame for supporting the carriage and for operating the shelf elevating mechanism; and Fig. 7 is a vertical sectional view taken in the plane along the line 7—7 of Fig. 3 and showing in elevation the mechanism for vertically adjusting the shelf within the broiler compartment.

In Fig. 1 of the drawings there is illustrated in perspective a cabinet range provided with a table top surface 10, having an oven compartment closed by a door 12, and a broiler compartment below the oven compartment and provided with a door 14. The broiler compartment, designated at 16 (see Fig. 2), has suitably supported in the upper portion thereof a gas burner 18 providing a source of heat for the oven thereabove as well as for broiling foods within the compartment 16. The supply of gas to the burner 18 may be controlled in any conventional manner.

To each of the side walls 20 of the broiler compartment there is affixed a horizontally disposed guideway 22, in each of which guideways a roller 24, mounted upon the outside of each of the side members 26 of the carriage 28 adjacent the rear end thereof, is disposed. The carriage 28 comprises spaced horizontally disposed side frame members 26, a transverse frame member 27 connected to the forward ends of the side frame members 26, upwardly extending brackets 29 mounted upon the forward end of the side frame members 26, a panel 31 forming a bottom wall of the carriage and supported at its rearward end by a pair of brackets 30 connected to the side frame members 26 and supported at its forward end by a horizontally extending portion of the transverse frame member 27. The door closure 14 is suitably secured to the upwardly extending members 29 and to the transverse frame member 27 by a plurality of bolts 33.

A pair of brackets 36 are mounted upon the framework of the stove at the front sides of the broiler compartment, upon each of which brackets 36 there is mounted a pair of rollers 40 and 42. The rollers 42 are provided with side flanges 44 and form rolling guides for the frame members 26. It will thus be seen that the carriage 28 is mounted for movement into and out of the broiler compartment and that the door closure 14 for the broiler compartment is secured to the front end of the framework of the carriage 28 so that when the carriage 28 is disposed within the broiler compartment the opening leading thereto will be closed.

At the rear end of each of the side frame members 26 there is provided a bracket 50, to the upper end of which an arm 52 is pivotally connected at 54. Below the pivotal connection 54 there is affixed to the side frame member 26 a pin 56 and collar 58 which provide a pivotal mounting for a second lever 60 which is disposed parallel to the lever 52. Levers or links 52 and 60 form a part of a mechanism mounted upon the carriage 28 which is adapted to support a shelf or broiling element 62 upon which food is adapted to be placed for the purpose of cooking the same.

Opposite ends of the links or levers 52 and 60 are pivotally connected to a bracket 64 of a frame 66 which is adapted to support the broiling element 62. The links or levers 52 and 60 are so connected to the carriage 28 and to the bracket 64 as to permit vertical adjustment of the broiling element 62 and also to maintain the same in a substantially level position in whatever position said broiling element is supported.

The under side of each of the links 60 comprises a cam surface which is engageable with the roller 40 mounted upon the bracket 36 so that as the carriage is moved from the position in which it is illustrated in Fig. 2 to the position in which it is illustrated in Fig. 4, the broiling plate or element 62 will be elevated. The cam surfaces of the links 60 do not engage the roller 40 until the carriage has moved a portion of the way out of the broiler compartment, so that when the food supporting element 62 is moved vertically, it will clear the framework of the stove. The end of the cam surfaces of the links 60 terminates in a notch 68 for the purpose of providing a rest for holding the broiling element 62 in an elevated position.

When the carriage 28 is moved back into the broiler compartment, the cam surfaces of the links 60 will ride down the roller 40 so as to lower the broiling element 62 to its normal position before the carriage entirely recedes within the broiler compartment. The rollers 40 are provided with side flanges 44 for guiding the cam surfaces of the links 60. Thus, when it is desired to place a food product to be cooked upon the broiling element 62 or remove a food product therefrom or to inspect the food product during the process of cooking, the broiling element will be moved from its position within the broiler compartment to a position out of the broiler compartment at the front of the stove and be at an elevation substantially above that at which the broiler element 62 normally is disposed. Thus, there is little likelihood of accidentally burning one's hands in operating the broiler and also stooping to the extent heretofore required will not be necessary for the purpose of inspecting the food during the process of cooking or of placing foods upon or removing foods from the broiling element.

There is provided a mechanism whereby the elevation of the broiler element 62 within the broiler compartment may be varied without movement of the carriage 28. This mechanism comprises a pair of brackets 75 secured to the transverse frame member 27 at spaced points to provide a bearing for a U-shaped lever member 76, each end of which is engageable with a portion 78 of the ends of the links 60. A pair of arms 80 are secured in spaced relation to the member 76 at the center thereof. A member 82 has oppositely disposed arms 83 thereof projecting through openings in each of the arms 80 and has a central portion 84 which is internally threaded to receive a screw-threaded shaft 86 journaled in the closure member 14 and having an operating member 85 disposed exteriorly thereof. Operation of the threaded shaft 86 is adapted to move member 82 either forwardly or backwardly within certain limits, and as a result of the connection of the member 82 with the U-shaped member 76, such operation of the threaded shaft 86 is adapted to raise or lower the ends of the member 76 which are in engagement with the portions 78 of the links 60. Vertical movement of the ends of the member 76 will operate to raise or lower the frame 66 on which the broiling element is supported for the purpose of adjusting the elevation thereof with respect to that of the burner 18.

In Fig. 5 the broiling element 62 is shown in an elevated position within the broiler compartment. When the broiling element 62 is so elevated, the cam surfaces of the links 60 will not engage with the rollers 40 until the carriage 28 has moved to a position further out of the broiler compartment than is the case when the broiling element 62 is disposed at a lower elevation within the broiler compartment. The broiling element 62 illustrated comprises a thick metallic plate having a substantially flat and impervious upper surface in which an opening 96 is provided whereby the greases and liquids resulting from the cooking of food may be drained into a tray 98 supported upon the bottom wall 31 below the opening 96.

The cooking plate 62 upon which a food product is adapted to be placed for the purpose of cooking said food product is adapted to absorb radiated heat from the burner 18 outside of the area upon which the food product is supported and to conduct said heat to the area of the plate supporting the food product for the purpose of cooking the under side thereof substantially as fast as the upper side of said food product is cooked, by radiated heat from the burner 18. The food product may thereby be cooked simultaneously on both sides without the necessity of turning the food product during the process of cooking. As the cooking plate 62 operates to cook the under side of the food product supported thereon, it is advisable to heat the cooking plate 62 before the food product is placed thereon. This initial heating of the plate 62 may be accomplished more expeditiously by operating the control 85 to elevate the cooking plate 62 within the burner compartment and move the same in close proximity to the burner 18 for the purpose of rapidly bringing the cooking plate 62 up to approximately a cooking temperature. After the plate has been heated sufficiently, it may be lowered to an extent sufficient so that the food product supported upon the cooking plate will not be in too close proximity to the burner 18, taking into consideration the thickness of the food product which it is proposed to cook. While the particular kind of cooking element illustrated has many advantages over the usual wire rack or grid, it is to be understood that such racks or grids may be used in lieu of the cooking plate 62 without departing from the scope of the invention.

While the invention has been described with some detail, it is to be understood that the description is for the purposes of illustration only and is not definitive of the limits of the inventive idea. The right is reserved to make such changes in the details of construction and arrangement of parts as will fall within the purview of the attached claims.

We claim:

1. In a device of the class described, a source of heat, means for supporting a food product beneath said heat source for the purpose of cooking said food product, laterally shiftable means carrying said supporting means and operable for moving the same out from beneath said heat source, and means including a stationary member and a portion of said shiftable means cooperable upon shifting movement of the shiftable means to raise and lower said supporting means.

2. In a stove, a broiler compartment provided with a source of heat, means for supporting a food product below said heat source for the purpose of cooking said food product, said compartment being provided with an opening, a closure for said opening, a laterally shiftable device operated by said closure and upon which device said food supporting means are mounted whereby the same may be moved from under said heat source and out of said compartment through said opening, and means operable by the shifting of said device to move said food supporting means out of said compartment for elevating said food supporting means.

3. In a stove having a broiler compartment with a source of heat therein, means for supporting a food product below said heat source for the purpose of cooking said food product, a movable carriage mounted for sliding movement in the bottom of said compartment and upon which carriage said food supporting means are mounted, said carriage upon movement thereof being adapted to shift said food supporting means out from under said heat source and out of said broiler compartment, and means operable by the shifting of said food supporting means out of said broiler compartment for vertically moving said food supporting means to an elevation above that at which it is disposed within said broiler compartment.

4. In a stove having an oven provided with an opening, a closure therefor, and a source of heat, a movable shelf for supporting a food product within said oven for the purpose of cooking said food product, a carriage mounted for movement into and out of said oven compartment and upon which carriage said shelf and said closure are carried, and means for elevating said shelf operable by the movement of the carriage out of said oven compartment.

5. In a stove provided with an oven compartment and a source of heat, a shelf supported from and within the oven and provided with means for moving the same out of and into the oven, said shelf being adapted to support a food product within said oven for the purpose of cooking said food product, means operable for vertically adjusting the position of said shelf within said oven compartment, and means operable for elevating said shelf by the movement of the same out of said oven compartment.

6. A stove oven compartment provided with a source of heat, an opening and a closure for said opening, a carriage movable into and out of said compartment through said opening, a shelf for supporting a food product to be cooked within said oven, link mechanism pivoted to said carriage and to said shelf and adapted to support said shelf in a level condition, and means cooperable with said link mechanism upon movement of said carriage for vertically moving said shelf.

7. A stove oven compartment provided with a source of heat, an opening and a closure for said opening, a carriage movable into and out of said compartment through said opening, a shelf for supporting a food product to be cooked within said oven, link mechanism pivoted at one end thereof to said carriage and at the other end thereof to said shelf and adapted to support said shelf in a level condition at a plurality of elevations, one of said links of said link mechanism being provided with a cam face, and a member fixed to the frame of said stove adjacent the opening in said oven compartment, said cam face being cooperable with said member upon movement of said carriage for elevating said shelf.

8. A stove oven compartment provided with a source of heat, an opening and a closure for said opening, a carriage movable into and out of said compartment through said opening, a shelf for supporting a food product to be cooked within said oven, mechanism for supporting said shelf in a level condition at a plurality of elevations comprising a pair of parallel links each of which is pivoted at one end thereof to said shelf and at the other end thereof to said carriage adjacent one end thereof, one of said links being provided with a cam face, and means fixed to said stove and engageable with said cam face upon movement of said carriage out of the oven through said opening for vertically moving said shelf to an elevation above that at which said shelf is disposed within said oven compartment.

9. A stove oven compartment provided with a source of heat and an opening, a carriage movable into and out of said compartment and provided at its forward end with a wall forming a closure for said opening, a shelf for supporting a food product to be cooked within said oven, mechanism for supporting said shelf in a substantially level condition at a plurality of elevations, said mechanism comprising a plurality of parallel links connected at one end thereof to said shelf and pivotally secured at the other end thereof to said carriage for vertical movement, means cooperable with said mechanism for vertically adjusting said shelf within said oven compartment, and means affixed to said stove and cooperable with said mechanism upon movement of said carriage for vertically moving said shelf.

10. In a stove, a broiler compartment provided with a source of heat and an opening, a carriage movable into and out of said compartment through said opening and provided with a wall at the forward end thereof forming a closure for said opening, means for supporting a food product below said heat source for the purpose of cooking said food product, link mechanism mounted on said carriage and adapted to support said food supporting means, means for adjusting said mechanism for vertically moving said food supporting means within said broiler compartment and having a control member mounted externally of said wall, and means cooperable with said mechanism and operable by movement of said carriage out of said broiler compartment for elevating said food supporting means in a position out of said broiler compartment.

11. In a stove, a broiler compartment provided with a source of heat, means for supporting a food product beneath said heat source, laterally shiftable means carrying said food supporting means and operable for moving the same out from beneath said heat source, and means fixedly carried by said stove and cooperable with said shiftable means upon movement thereof for vertically moving said supporting means as the same is moved out from beneath said heat source.

12. In a stove, a broiler compartment provided with a source of heat, means for supporting a food product beneath said heat source, laterally shiftable means carrying said food supporting means and operable for moving the same out from beneath said heat source, and cooperating cam means carried by said stove and by said shiftable means operable upon movement of the latter for vertically moving said supporting means as the same is moved out from beneath said heat source.

13. In a device of the class described, a source of heat, means for supporting a food product beneath said heat source for the purpose of cooking said food product, said food supporting means being laterally movable out from beneath said heat source, means for vertically moving said food supporting means and operable by movement of the same out from beneath said heat source and an adjustable stop for determining the position of said food supporting means as the same is moved back beneath said heat source.

ALVIN G. SHERMAN.
HERBERT E. MILLS.